Dec. 15, 1953 O. E. TROYER 2,662,618
PRESSURE-BOOSTING APPARATUS FOR VEHICLE
HYDRAULIC BRAKE SYSTEMS
Filed May 29, 1952 3 Sheets-Sheet 1

INVENTOR.
ORA E. TROYER,
BY
McMorrow, Berman + Davidson
ATTORNEYS.

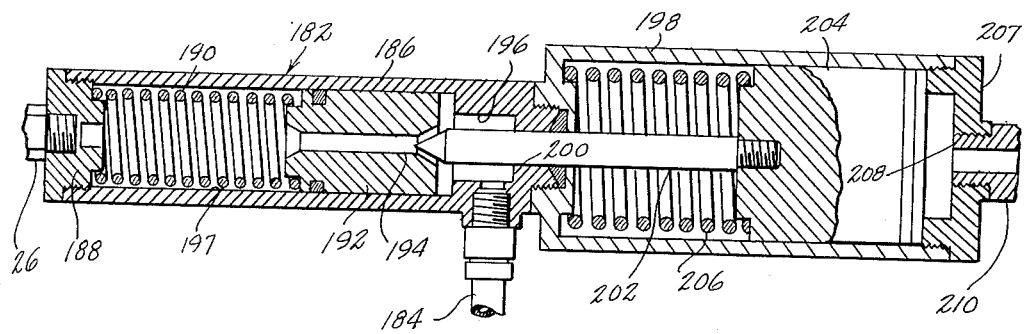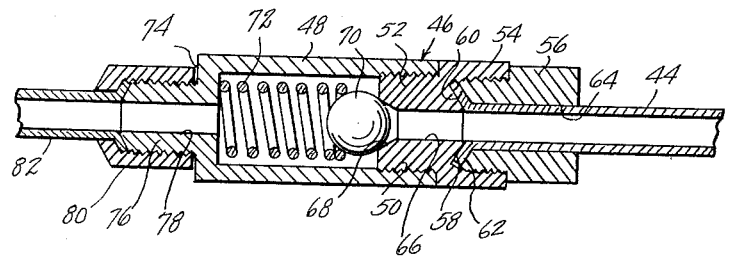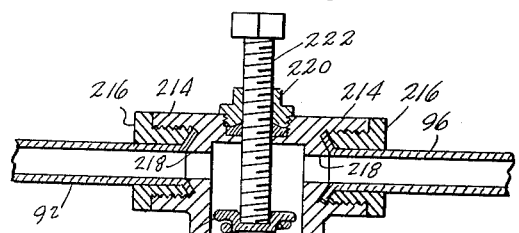

Dec. 15, 1953
O. E. TROYER
2,662,618
PRESSURE-BOOSTING APPARATUS FOR VEHICLE
HYDRAULIC BRAKE SYSTEMS
Filed May 29, 1952
3 Sheets-Sheet 3
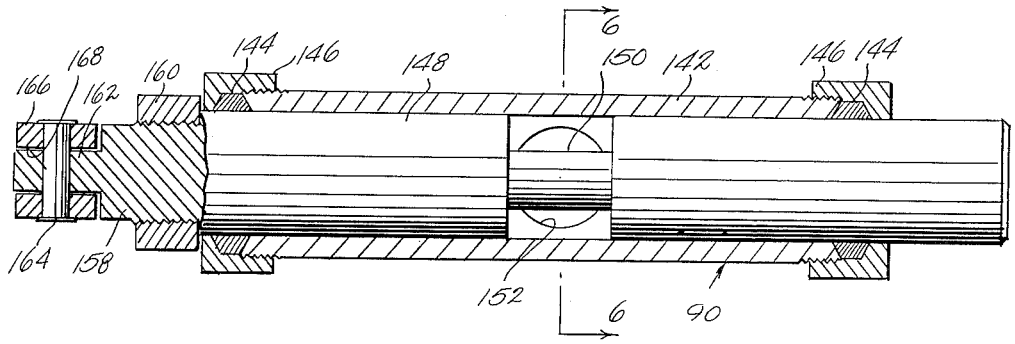
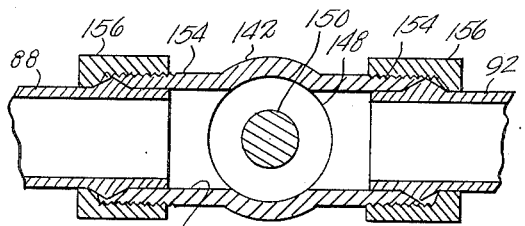
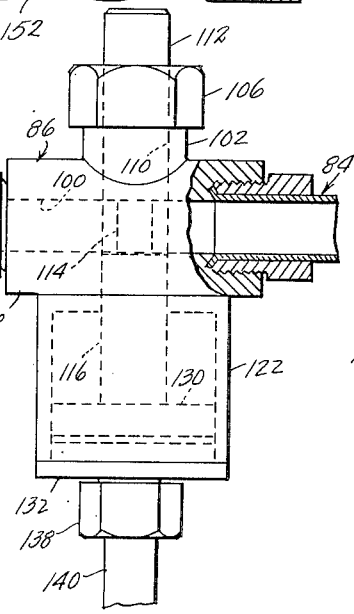
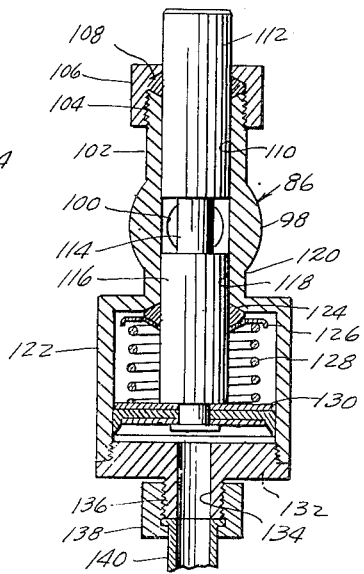
INVENTOR.
ORA E. TROYER,
BY
McMorrow, Berman + Davidson
ATTORNEYS.

Patented Dec. 15, 1953

2,662,618

UNITED STATES PATENT OFFICE 2,662,618

PRESSURE-BOOSTING APPARATUS FOR VEHICLE HYDRAULIC BRAKE SYSTEMS

Ora E. Troyer, Hampton, Va.

Application May 29, 1952, Serial No. 290,777

3 Claims. (Cl. 188—152)

This invention relates to an apparatus for adding to the pressure applied to the brakes of a motor vehicle through the conventional hydraulic brake system thereof.

Among the important objects of the invention are the following:

First, to increase the effectiveness of the conventional brake system of a vehicle such as a heavy truck, without requiring more than normal foot pressure upon the brake pedal;

Second, to improve upon booster systems such as those of the vacuum-operated type, which operate well at low speeds but provide less boosting pressure when the brakes are applied while the vehicle is moving at high speed;

Third, to provide a system wherein more boosting pressure will be exerted at high speed, when it is most needed than at low speed, when it is least needed; and Fourth, to provide a booster apparatus as described that can be built as a compact unit and readily mounted on a suitable bracket in association with a conventional hydraulic brake system.

Other objects will appear from the following description, the claims appended thereto, and from the annexed drawings, in which like reference characters designate like parts throughout the several views, and wherein:

Figure 2 is an enlarged longitudinal section through a control cylinder, taken on line 2—2 of Figure 1;

Figure 3 is an enlarged longitudinal section through a main check valve, taken on line 3—3 of Figure 1;

Figure 4 is an enlarged longitudinal section through a relief check valve, taken on line 4—4 of Figure 1;

Figure 5 is an enlarged longitudinal section through a slide valve, taken on line 5—5 of Figure 1;

Figure 6 is a transverse sectional view of the slide valve, taken on line 6—6 of Figure 5;

Figure 7 is an enlarged longitudinal section through a hydraulic control valve, taken on line 7—7 of Figure 1; and Figure 8 is an enlarged front elevation of the hydraulic control valve, a portion being shown in section.

Figure 1:
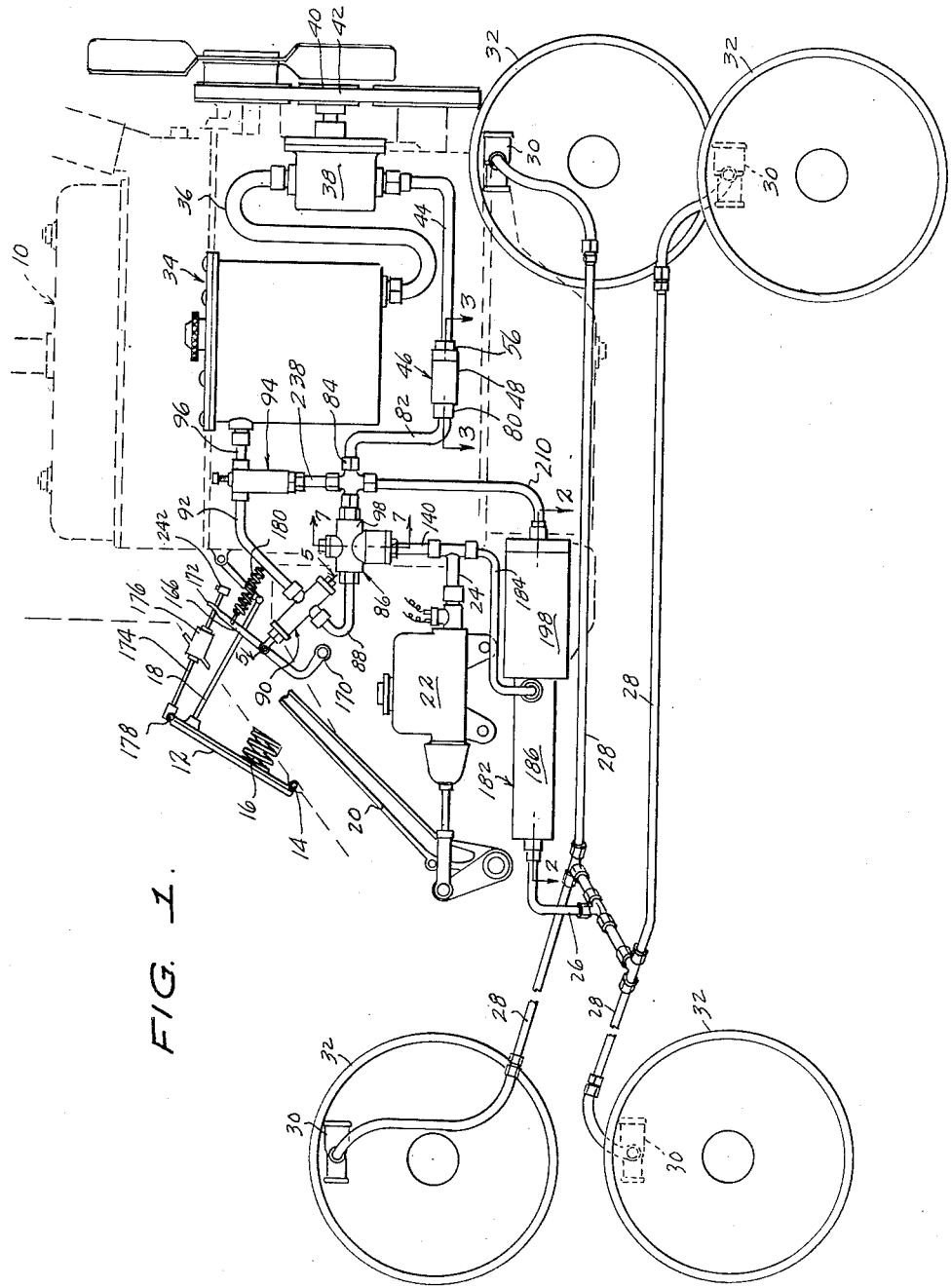
Figure 1 is a diagrammatic view of an apparatus formed in accordance with the present invention.

A vehicle engine 10 has associated therewith an accelerator pedal 12, pivotally mounted on the vehicle floor board at 14 and normally pressed outwardly to an "idle" position by an accelerator return spring 16. A throttle control rod 18 is operable by depression of the pedal to feed fuel to the engine.

This is conventional, per se. Also basically conventional is the brake pedal arm 20, pivotally mounted below the floor board and swingable by depression of the usual brake pedal, not shown, to force fluid from a master cylinder 22. Normally, the outlet line 24 of the master cylinder would be connected directly to a line 26 having branches leading to individual lines 28 extending to the wheel cylinders 30 of the several brake drums 32.

The invention includes a reservoir 34 from the lower end of which extends a line 36 to a pump 38 having a pulley 40 driven by fan belt 42. A line 44 extends from the pump to a main check valve 46.

The main check valve 46 is shown in detail in Figure 3, and includes a hollow, cylindrical body 48, one end 50 of which is formed open and is internally threaded to engage complementary threads on the reduced inner end of a closure member 52. The outer end of member 52 has a peripheral skirt 54 internally threaded to engage the threaded inner end of a connector sleeve 56. A tapered seat 58 is provided on the outer end of the closure member, complementing the taperingly recessed inner end surface of the sleeve 56, and engaged between the member and sleeve is the flared end 62 of the line 44, said line extending through an axial bore 64 of the sleeve, and communicating with a bore 66 of the closure member, that has a tapered seat 68 at its inner end for a ball 70. The ball 70 is normally held against the seat by a spring 72.

At its other end, the body 48 has an end wall 74 integral with an axial extension 76, a bore 78 being formed in the end wall and the extension and opening at one end into the body. The extension 76 is threaded to receive a spanner nut 80 that couples a line 82 to the extension, in communication with the other end of the bore 78.

The line 82 leads to a four-way fitting 84, and also in communication with the fitting is a hydraulic control valve 86, to which is attached a line 88 leading to a slide valve 90. A line 92 extends from the slide valve to a relief valve 94, a line 96 communicating between the relief valve and the reservoir 34.

When the engine is not running, check valve 46 is closed. When the engine is running, and no braking power is being applied by the engine operator, the check valve will be forced to open position, due to operation of the pump 38. The pump, in operation, will cause the flow of fluid in a closed cycle from the reservoir, through line 36, the pump 38, line 44, open check valve 46, line 82, fitting 84, hydraulic control valve 86, line 88, slide valve 90, line 92, relief valve 94, line 96, and back into the reservoir.

It is appropriate at this point to consider the construction of the control valve 86, which is shown in detail in Figures 8 and 9. The valve 86 includes a cylindrical body 98 having a longitudinal bore 100 opening at the opposite ends of the body. A lateral extension 102 is integral with the body, and extends away therefrom medially between the opposite ends of the body, said extension being externally threaded as at 104 at its upper end. A nut 106 is applied to the threaded end of the lateral extension, and serves as a retainer for packing 108.

Formed in the extension 102 is a bore 110, communicating with the bore 100 of the body 98. A plunger or valve member 112 is slidable in the bore 110, said plunger being reduced in diameter intermediate its ends as at 114. The lower, full diameter portion of the plunger has been designated by the reference numeral 116, and is slidable in the bore 118 of a short lateral extension 120 coaxial with the extension 102 and extending away from the opposite side of the body. At its outer end, the extension 120 is integral with a cylinder 122, packing 124 being circumposed about the lower portion 116 of the plunger at the inner end of the cylinder. The packing is held in place by a retaining disc 126, a spring 128 being circumposed about the lower portion 116 within the cylinder and abutting at one end against the disc.

At its other end, the spring 128 abuts against a piston 130 working within the cylinder toward and away from a cap 132 threaded into and closing the outer end of said cylinder. The cap has a center opening 134, which continues into and through a center boss 136 formed upon the cap and externally threaded to receive a nut 138 used to hold the adjacent end of a hydraulic control valve fluid supply line 140 in communication with the interior of the cylinder.

As will be noted, the spring 128 acts to normally retain the plunger in a position in which the reduced medial portion 114 thereof will be in registration with the longitudinal bore 100 of the body 98, thus to permit the free flow of pressure fluid from the fitting 84 through the hydraulic control valve to the line 88, when the engine is running and no braking power is being applied, this flow of fluid being part of the normal cycle discussed above.

It is now appropriate to consider the construction of the slide valve 90, this being shown in detail in Figures 5 and 6. This valve includes an elongated, cylindrical body 142, said body being hollow from end to end and having bevelled end edges against which are seated packing rings 144, said rings being retained in place by nuts 146 threaded upon the respective ends of the body 142.

A slide 148 is of cylindrical formation, and is slidable in opposite directions longitudinally of and within the body. Intermediate its opposite ends, the slide is of reduced diameter as shown at 150, the reduced medial portion of the slide being normally disposed in registration with the bore 152 of a tubular cross member 154, the opposite ends of which project laterally in opposite directions from the medial portion of the body 142, this being best shown in Figure 6. The outer ends of the cross member 154 are externally threaded to receive spanner nuts 156 that connect the lines 88, 92 respectively, in communication with the bore 152.

On one end of the slide 148, a reduced, exteriorly threaded, axial extension 158 is formed thereon, on which is engaged a nut 160 which limits movement of the slide in one direction, by engaging the adjacent nut 146.

The axial extension 158 has a tongue 162 integral therewith, said tongue having a transverse opening receiving a pin 164 the ends of which are extended into an opening formed in the intermediate portion of an elongated control rod 166, said opening of the control rod extending transversely thereof and communicating with an elongated longitudinal slot 168 provided in said intermediate portion of the control rod and receiving the tongue 162.

The general appearance of the control rod is best shown in Figure 1, from which it is seen that the rod has an angular extension at one of its ends. The free or outer end of the extension is pivoted at 170 upon a suitable bracket or structural member, not shown, of the vehicle.

At the other end of the control rod, there is formed thereon a ring 172 slidable loosely upon a control cable 174 reciprocable within and projecting beyond the opposite ends of the control cable housing 176. The housing 176 is mounted upon the floor board of the vehicle, the cable extending away from the floor board and being attached pivotally, as at 178, to the outer or free end of the accelerator pedal 12.

As will be noted from Figure 1, I provide a spring 180, one end of which I attach to the control rod 166 and the other end of which I secure to any suitable bracket or structural member of the vehicle. This spring is so tensioned as to normally pull the control rod to the right in Figure 1, and as a result, the nut 160 will be normally engaged against the nut 146 adjacent thereto, so as to cause the reduced medial portion 150 of the slide to be normally positioned where it will permit free flow of fluid through the slide valve while said fluid is describing its normal cycle traced hereinbefore and persisting whenever the engine is running with no braking power being applied.

Reference should now be had to a control cylinder designated generally by the reference numeral 182 and interposed between the master cylinder 22 and the several lines 28 to the wheels. The control cylinder is shown in detail in Figure 2, a line 184 being extended to the medial portion thereof from the master cylinder, with said line being in communication not only with the outlet line 24 of the master cylinder, but also with the line 140 leading to the cylinder 122 of the hydraulic control valve 86.

The control cylinder 182 is formed with an elongated, cylindrical, tubular, body portion 186 closed at one end by a cap 188. A spring 190 disposed within the body portion 186 abuts at one end against the cap 188, and at its other end, abuts against a piston 192 slidably mounted within the body portion and formed with an end to end longitudinal bore 194. The provision of the piston 192 defines chambers at opposite ends of the body portion, one of said chambers being designated 196 and being in communication with the line 184 that extends from the master cylinder to the control cylinder. The other chamber 197 of the body portion has the spring 190 positioned therein and is in communication with the line 26 leading from the control cylinder to the wheel lines 28. The chambers of the body portion normally communicate with one another, by reason of the provision of the bore 194 of the piston 192.

Therefore, from what has so far been described with reference to the brake pedal arm 20, master cylinder 22, and control cylinder 182, it is observed that on initial depression of the brake pedal of the vehicle for the purpose of applying the brakes, fluid will be forced from the master cylinder through line 24, line 184, chamber 196, bore 194, line 26, and lines 28 to the several vehicle wheels.

It will be readily appreciated that in the application of hydraulic pressure in the manner described above for the purpose of setting the wheel brakes in the normal manner, the chamber 197 of the body portion 186 will be filled completely with pressure fluid. Therefore, if the bore 194 of the piston 192 were closed, and the piston 192 moved to the left in Figure 2, an added or boosting pressure would be applied to the wheel brakes, setting them even more firmly and thus providing the increased braking force which is one important purpose of the invention.

The means which I provide for shifting the piston 192 to the left in Figure 2, with its bore closed, acts automatically when normal pressure is applied by the foot of the vehicle operator to the brake pedal. This means includes a hollow cylinder member 198 increased in diameter above that of the body portion and secured at one end to the adjacent end wall of the body portion. In said end wall of the body portion is an opening 200, and slidably mounted in said opening is a plunger 202 one end of which extends into the chamber 196 and is pointed for engagement against a complementarily tapered seat formed on the piston 192.

The other end of the plunger 202 is disposed within the cylinder member 198 and is secured to a secondary piston 204 reciprocable within said member. A spring 206 is in engagement at one end with the piston 204, and at its other end abuts against one end wall of the cylinder 198. The spring 206 is held under compression and normally urges the piston 204 and its associated plunger 202 to the right in Figure 2, to unseat the plunger from the primary piston 192 and thereby cause the bore 194 to be normally open.

That end of the cylinder 198 remote from the body portion 186 is formed open and is internally threaded for engagement with complementary threads formed upon a peripheral flange of a cap 207 having a center opening 208 threaded to receive the adjacent end of a line 210 extending between cylinder 198 and the four-way fitting 84.

Preliminary to discussion of the operation of the device, it is advisable to consider the construction of the relief valve 94. This is shown in detail in Figure 4, and includes a cylindrical body 212, integrally formed at one end with a closed end wall and oppositely extended, tubular, lateral extensions 214 internally threaded to receive closure plugs 216. The extensions 214 have openings communicating with the interior of the body 212, and aligned coaxially with openings in the plugs through which extend the adjacent ends of the lines 92, 96 respectively. Lines 92, 96 have flared ends gripped between the plugs and internal, annular shoulders provided upon the extensions.

The end wall of the body 212 has an internally threaded opening in which is engaged a packing retainer 220 formed with a threaded opening engaging an adjusting screw 222 projecting into the body 212 and engaging a disc 224 against which is seated one end of a spring 226.

The other end of the spring is engaged against a ball 228 and normally urges said ball against a valve seat 230 formed in the inner end of a closure member 232 having a reduced portion 234 threadedly engaged with the adjacent end of the body 212 and closing the same.

Formed in the closure member is an axial bore 236 opening at one end into the body 212, said bore communicating at its other end with the adjacent end of a bypass line 238 extending between the relief valve and the four-way fitting 86. The outer end of the closure member is formed as an internally threaded skirt in which is engaged a coupling nut 240 that secures the line 238 to the relief valve.

In use, and with the engine running, the pump will ordinarily cause fluid flow through the check valve 46, fitting 84, hydraulic control valve 86, slide valve 90, relief valve 94, reservoir 34, and back to the pump.

When pressure is applied to the brake pedal of the vehicle in the normal manner, fluid will flow from the master cylinder 22 through lines 24, 184 into the chamber 196 of the control cylinder 182, the fluid then being forced through the open bore 194 into the chamber 197 and from there to the several wheel cylinders.

The pressure applied to the brake pedal will, at the same time, cause fluid to be forced under pressure from the master cylinder through lines 24, 140 against the piston 130 (Figure 7), this last named pressure being increased responsive to continued movement of the usual piston, not shown, provided in the master cylinder, after the lines 28 to the several wheels are filled with pressure fluid.

The movement of piston 130 under pressure of the fluid forced thereagainst will be effective to shift the plunger 112 upwardly to close off communication between fitting 84 and line 88. As a result, the fluid pumped through line 82 into the fitting 84 will be diverted into line 210 and will be forced against piston 204 (Figure 2). This will cause plunger 202 to close bore 194 while at the same time shifting piston 192 to the left in Figure 2. The fluid trapped in chamber 197 will, therefore, be forced through lines 28 to add to the braking pressure and provide the desired booster for the hydraulic braking system of the vehicle.

It will be noted that when the fluid pumped from the pump 38 has shifted piston 204 to the left in Figure 2, for the full amount of the travel permitted therefor, the relief valve 94 will open, to permit fluid so pumped to move from the four-way fitting through said relief valve and back into the reservoir.

The invention is also adapted to cause the wheel brakes to be set when the accelerator pedal is in idle position, that is, whenever the vehicle is stopped. When the accelerator pedal is depressed, as it will be whenever the vehicle is to move, the spring 180 will be effective to hold the slide valve open. When, however, foot pressure is taken off the accelerator pedal 12, the spring 14, being stronger than the spring 180, will cause an abutment 242 on the inner end of the control cable to engage the ring 172, swinging control rod 166 to the left in Figure 1 and closing the slide valve. This has the same effect on the normal cycle of fluid passing through the pump 38 as closing of the hydraulic control valve 86 does, that is, it causes diversion of the fluid from the four-way fitting 84 through line 210 into control cylinder 182, to set the brakes.

It is believed clear that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. In combination with the engine of a vehicle, and with a hydraulic brake system of said vehicle including a master cylinder and wheel supply lines through which fluid is forced from the master cylinder responsive to foot pressure exerted by a vehicle operator, brake-pressure-additive apparatus comprising: a pump driven by said engine; a reservoir for pressure fluid connected in circuit with the pump for normal flow of fluid in a closed cycle therebetween; a hydraulic control valve disposed in circuit with the pump and reservoir and arranged to be normally open for normally allowing an unimpeded flow of fluid in said closed cycle; a four-way fitting also included as a part of said circuit and disposed between the valve and pump; a fluid flow line extending from said fitting, at a location between the valve and pump, to said wheel supply lines; a hydraulic control valve fluid supply line extending from the master cylinder to the hydraulic control valve, said valve including a piston arranged for closing of the valve responsive to pressure exerted thereagainst by fluid forced from the master cylinder through the hydraulic control valve supply line; whereby to cause fluid to be diverted from said closed cycle through the fluid flow line to the wheel supply lines for adding to the braking pressure applied to the wheel supply lines; a bypass line extending from said fitting; and a relief check valve communicating with said bypass line and with said circuit at a location between the hydraulic control valve and the reservoir, for bypassing a quantity of fluid from the pump to the reservoir in the closed condition of the hydraulic control valve.

2. In combination with the engine of a vehicle, and with a hydraulic brake system of said vehicle including a master cylinder and wheel supply lines through which fluid is forced from the master cylinder responsive to foot pressure exerted by a vehicle operator, brake-pressure-additive apparatus comprising: a pump driven by said engine; a reservoir for pressure fluid connected in circuit with the pump for normal flow of fluid in a closed cycle therebetween; a hydraulic control valve disposed in circuit with the pump and reservoir and arranged to be normally open for normally allowing an unimpeded flow of fluid in said closed cycle; a four-way fitting also included as a part of said circuit and disposed between the valve and pump; a fluid flow line extending from said fitting, at a location between the valve and pump, to said wheel supply lines; a hydraulic control valve fluid supply line extending from the master cylinder to the hydraulic control valve, said valve including a piston arranged for closing of the valve responsive to pressure exerted thereagainst by fluid forced from the master cylinder through the hydraulic control valve supply line, whereby to cause fluid to be diverted from said closed cycle through the fluid flow line to the wheel supply lines for adding to the braking pressure applied to the wheel supply lines; a bypass line extending from said fitting; a relief check valve communicating with said bypass line and with said circuit at a location between the hydraulic control valve and the reservoir, for bypassing a quantity of fluid from the pump to the reservoir in the closed condition of the hydraulic control valve; and a control cylinder communicating between the master cylinder and the wheel supply lines, said control cylinder including a piston having a bore normally open for the passage of fluid from the master cylinder to the wheel supply lines during normal braking action exerted by a vehicle operator, a plunger adapted when shifted in one direction to close said bore and shift the last-named piston within the control cylinder in a direction to add to the pressure exerted against the fluid passing to the wheel supply lines, and a secondary piston carrying said plunger and arranged to shift the same in said bore-closing direction, said fluid flow line communicating with the control cylinder for directing fluid against the secondary piston in the closed hydraulic valve condition.

3. In combination with the engine of a vehicle, and with a hydraulic brake system of said vehicle including a master cylinder and wheel supply lines through which fluid is forced from the master cylinder responsive to foot pressure exerted by a vehicle operator, brake-pressure-additive apparatus comprising: a pump driven by said engine; a reservoir for pressure fluid connected in circuit with the pump for normal flow of fluid in a closed cycle therebetween; a hydraulic control valve disposed in circuit with the pump and reservoir and arranged to be normally open for normally allowing an unimpeded flow of fluid in said closed cycle; a four-way fitting also included as a part of said circuit and disposed between the valve and pump; a fluid flow line extending from said fitting, at a location between the valve and pump, to said wheel supply lines; a hydraulic control valve fluid supply line extending from the master cylinder to the hydraulic control valve, said valve including a piston arranged for closing of the valve responsive to pressure exerted thereagainst by fluid forced from the master cylinder through the hydraulic control valve supply line, whereby to cause fluid to be diverted from said closed cycle through the fluid flow line to the wheel supply lines for adding to the braking pressure applied to the wheel supply lines; a bypass line extending from said fitting; a relief check valve communicating with said bypass line and with said circuit at a location between the hydraulic control valve and the reservoir, for bypassing a quantity of fluid from the pump to the reservoir in the closed condition of the hydraulic control valve; a control cylinder communicating between the master cylinder and the wheel supply lines, said control cylinder including a piston having a bore normally open for the passage of fluid from the master cylinder to the wheel supply lines during normal braking action exerted by a vehicle operator, a plunger adapted when shifted in one direction to close said bore and shift the last-named piston within the control cylinder in a direction to add to the pressure exerted against the fluid passing to the wheel supply lines, and a secondary piston carrying said plunger and arranged to shift the same in said bore-closing direction, said fluid flow line communicating with the control cylinder for directing fluid against the secondary piston in the closed hydraulic valve condition; a normally open slide valve in said circuit between the hydraulic control valve and the relief check valve; and means connecting the slide valve to the accelerator pedal of the vehicle and adapted to close the slide valve responsive to movement of the accelerator pedal toward an "idling" position.

ORA E. TROYER.

References Cited in the file of this patent

UNITED STATES PATENTS

| Number | Name | Date |
|---|---|---|
| 1,903,973 | Boughton | Apr. 28, 1933 |
| 1,997,062 | Huffman | Apr. 9, 1935 |
| 2,328,634 | Schnell | Sept. 7, 1943 |
| 2,345,634 | Schnell | Apr. 4, 1944 |
| 2,478,002 | Mott | Aug. 2, 1949 |
| 2,569,028 | Stryker | Sept. 25, 1951 |